(No Model.)
H. SIMS.
DECORATION OF CLAY WARE.
No. 259,724. Patented June 20, 1882.
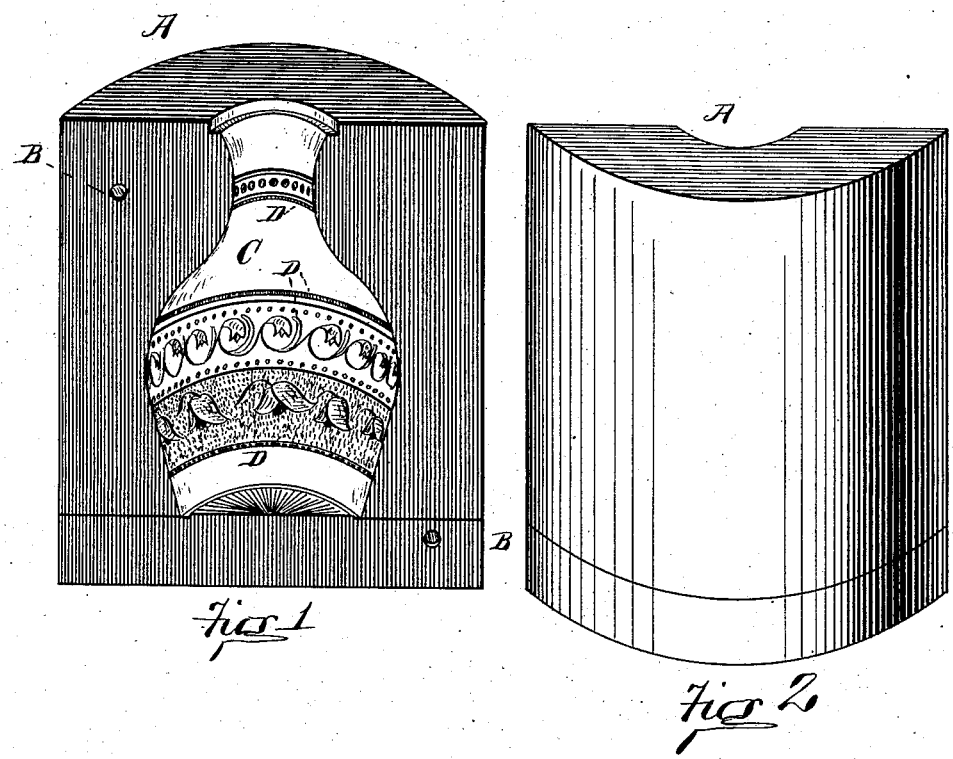
WITNESSES:
John Lorenz
John Rhoads
Henry Sims  INVENTOR
by James W. See.  ATTORNEY

UNITED STATES PATENT OFFICE.

HENRY SIMS, OF HAMILTON, OHIO.

DECORATION OF CLAY-WARE.

SPECIFICATION forming part of Letters Patent No. 259,724, dated June 20, 1882.

Application filed February 1, 1882. (No model.)

*To all whom it may concern:*

Be it known that I, HENRY SIMS, of Hamilton, in the county of Butler and State of Ohio, have invented certain new and useful Improvements in the Decoration of Clay-Ware, of which the following is a specification.

This invention relates to a process for giving color to the medallion decorations of ornamental clay-ware, the coloring-matter of such medallion decorations becoming a part of the material from which the ware is originally constructed, as distinguished from coloring-matter laid upon the decorations of constructed ware.

In the accompanying drawings, Figure 1 is a perspective view of the interior of half of a mold for use in making clay-ware, and Fig. 2 an external view of the same.

The mold shown is for an ornamental vase, the ornamental work D being in intaglio in the mold, whereby cameo ornamentation is produced in the ware made in the mold.

The mold may be of plaster-of-paris or any other material adapted for the purpose. The mold being closed and filled with the usual clay-liquid, the porous mold absorbs the water from the clay-liquid, leaving a substantial clay lining in the mold. This lining, being carefully removed, becomes a piece of clay-ware with decorations in medallion, the whole being of the body and color of the clay used.

In my process of giving color to the medallion decorations I proceed as follows: I apply to certain portions of the decorative recesses of the mold the desired color by means of a brush, choosing any coloring-matter which is adapted for use in connection with this general class of ware. I then apply other colors to other parts of the recesses and blend the colors where desired. In this way I bring out any desired combination of colors or ornamental effect, such as mingled flowers in natural colors, fancy designs, &c., depending, of course, on the character of design involved in the mold. I then close the decorated mold and proceed as usual. When the piece of ware is removed it brings out the colors with it, the colors forming part of the fundamental material of the article.

No special skill is required in the process, as the design is in the mold, and the operator needs simply to stain the proper recesses with the proper colors. If by lack of care the colors get daubed over into the groundwork of the mold, they can be wiped off without the need of much delicacy, thus leaving a ground of the color of the clay, with relief decorations of any desired colors.

Many attempts have been made to produce colored medallion-ware by applying solid colored decorations to the recesses of the mold, and also by filling in the recesses with some colored matter. These attempts have failed in every instance, for the reason that decorations of compacted matter thus joined with the body of the ware have a different shrinkage in burning, and thus frizzle up and peel and crack. The same is the case where masses of matter are filled into the recesses, no manual operation of forming a mass giving the same density as that produced by the absorbing action of the mold in forming the body of the ware. Both these operations produce ware which is thick at the medallions, they being in fact protuberances on the outside of the ware, and tending to produce differential shrinkage in burning. My colors are mere films or stains, and do not appreciably thicken the ware. The body, with the medallions, is all produced by the absorbing action, and is perfectly uniform in thickness, the action being somewhat analogous in uniform thickness of production to electro-deposition, every external medallion having a corresponding cameo inside the ware. There are no strains in burning. In fact, I in my experience know of no kiln losses by break or frizzle due to the colors, while by either of the methods above referred to the losses on such colored ware have been such as to enormously increase the cost of all such ware.

I claim as my invention—

The improved process of making clay-ware with medallion decorations in colors, which consists in applying stains of the various colors to the decorative recesses of the mold before the mold is filled with the clay-liquid, substantially as set forth.

HENRY SIMS.

Witnesses:
J. W. SEE,
JOHN LORENZ.